B. AYLOR.
ROUTER PLANE.
APPLICATION FILED APR. 3, 1912.
1,031,509.
Patented July 2, 1912.
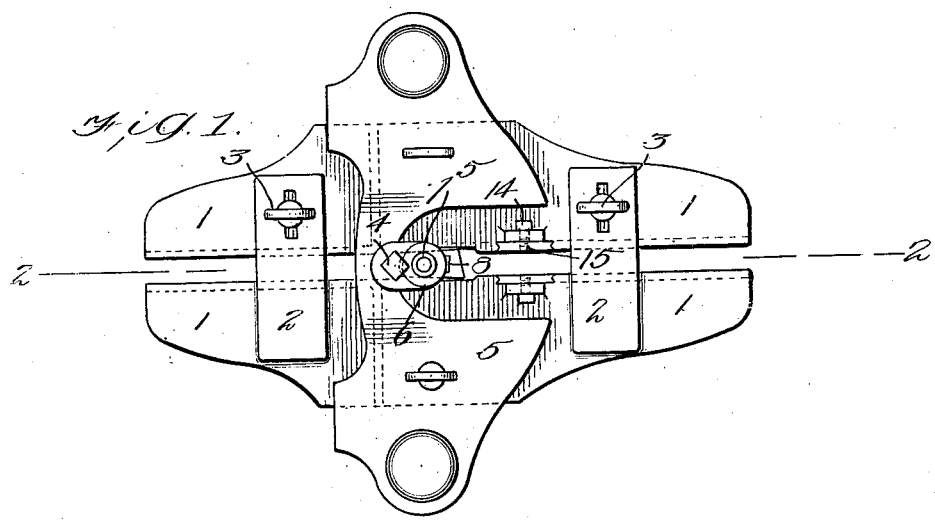
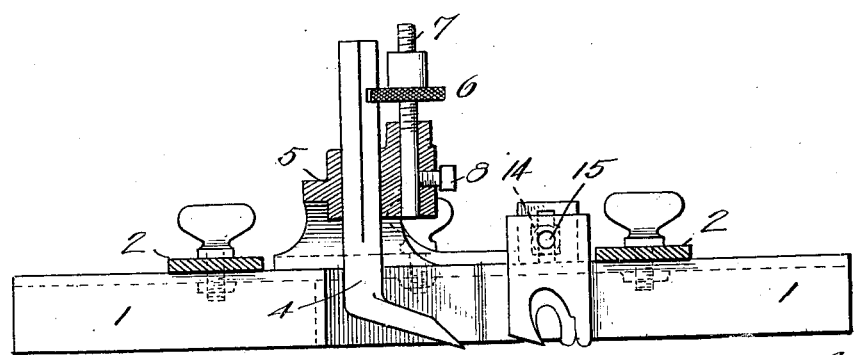
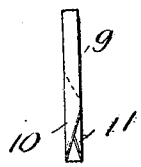
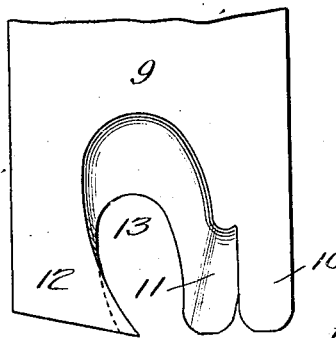
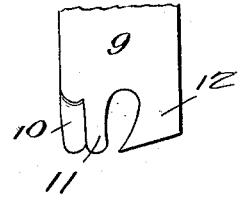
WITNESSES
INVENTOR
Bismark Aylor
BY Munn&Co.
ATTORNEYS

UNITED STATES PATENT OFFICE.

BISMARK AYLOR, OF CLEVELAND, OHIO.

ROUTER-PLANE.

1,031,509.

Specification of Letters Patent.    Patented July 2, 1912.

Application filed April 3, 1912. Serial No. 688,219.

*To all whom it may concern:*

Be it known that I, BISMARK AYLOR, a citizen of the United States, and a resident of Cleveland, in the county of Cuyahoga and State of Ohio, have invented an Improvement in Router-Planes, of which the following is a specification.

Ordinary router planes are provided with a bit or router proper adapted to cut grooves or depressions in the surface of woodwork. I provide a router plane stock with supplemental cutters and routers of peculiar construction and arrangement, the same being placed opposite each other in vertical position and adapted for lateral adjustment as required to cut grooves of different widths. These attachments are located in front of the ordinary router bit or tool which may then be used to cut and clean out the wood lying between the smaller grooves made by the two attachments when adjusted a greater or less distance apart.

In the accompanying drawing Figure 1 is a plan view of a router plane provided with my improved attachments. Fig. 2 is a central longitudinal section on the line 2—2 of Fig. 1. Fig. 3 is an enlarged side view of the combined cutting and routing device forming my invention proper. Fig. 4 is an end view of the same. Fig. 5 is an edge view. Fig. 6 is a side view.

The router plane shown in Figs. 1 and 2 comprises a stock formed of two duplicate, longitudinal, parallel members 1, 1, which are adjustably connected by means of metal bars 2 having slots that receive clamp-screws 3. A routing tool proper 4 is held in a metal bridge 5 whose ends extend beyond the side edges of the parallel members 1. This tool 4 is provided with a notch adapted to receive the milled nut 6, which is applied to a vertical screw 7 that is secured by a clamp-screw 8 in the front portion of the bridge. It is apparent that, by rotating the nut 6, the tool 4 may be set higher or lower between the longitudinal members 1.

My improved attachment is arranged in front of the routing tool 4 and is formed of a flat steel plate 9 having its lower edge provided with two pendent cutters 10 and 11 and a router 12, the latter being arranged in rear of said cutters and separated from them by a space 13, which provides an escape for the wood routed or removed by the bit 12.

As shown in Figs. 3 and 6, the cutter 10 is arranged in advance of the cutter 11, and, as shown in Fig. 5, the inner sides of these cutters are beveled to a fine edge, their outer sides being in the same plane with the body of the tool. The attachment comprising the tools constructed in duplicate as described are arranged vertical, parallel, and opposite, as shown in Fig. 1, and each is adapted for vertical adjustment, it being secured by a clamp-screw 14 to a slotted lug 15 forming a fixed attachment of one of the parts 1.

It will now be apparent that when the router plane or the frame of the same is reciprocated, the attachments described will cut into the wood at the distance apart indicated in Fig. 5 and that the router 12 following, will take up and remove the wood lying between the cuts so made and at the same time smooth the bottom of the groove which will thus be formed. When the two attachments are adjusted in contact, they will obviously form a single groove; but when adjusted apart from each other, as indicated in Fig. 1, they will form two parallel grooves which are separated by the same space as intervenes the attachments. The routing tool 4 forming an attachment of the plane proper may then be availed of to rout or remove the wood lying between the two parallel grooves thus made by my attachment.

What I claim is:—

1. A routing tool comprising a stock formed of two members which are adjustable toward and from each other, means for securing them in such adjustment, and routing and cutting attachments secured thereto and comprising steel plates arranged opposite each other in parallel vertical planes and having two cutters arranged in front, and a router arranged in rear of the same and adapted to coöperate therewith in the manner described.

2. The combination with an ordinary routing tool, comprising opposite stock members which are adjustable laterally toward and from each other, and a planing or routing tool mounted adjustably between said members, of routing attachments comprising steel plates arranged opposite each other and secured to the opposite members of the stock, each provided with cutters arranged in front and a router arranged in the rear, whereby said attachments are adapted to form separate parallel grooves, substantially as described.

BISMARK AYLOR.

Witnesses:
BERNARD MELLEN, Jr.,
HOMER D. COGAR.

Copies of this patent may be obtained for five cents each, by addressing the "Commissioner of Patents, Washington, D. C."